United States Patent [19]
Ballou

[11] 3,993,522
[45] Nov. 23, 1976

[54] METHOD OF MAKING ENDLESS POWER TRANSMISSION BELT STRUCTURE

[75] Inventor: David G. Ballou, Ozark, Mo.

[73] Assignee: Dayco Corporation, Dayton, Ohio

[22] Filed: Oct. 6, 1975

[21] Appl. No.: 620,486

Related U.S. Application Data

[62] Division of Ser. No. 492,948, July 30, 1974, Pat. No. 3,930,417.

[52] U.S. Cl. .............................. 156/137; 74/231 P; 74/232; 74/233; 156/189; 156/193; 156/244; 156/304

[51] Int. Cl.² ..................... B29D 29/00; B29H 7/22; B16G 1/26

[58] Field of Search ........... 156/137, 139, 140, 141; 156/244, 304, 324, 189, 193; 264/45.1, 45.9, 46.1, 172, 173, 176 R, 209, 248; 74/232, 233, 231 P; 428/493

[56] References Cited
UNITED STATES PATENTS

| | | | |
|---|---|---|---|
| 2,498,653 | 2/1950 | Daly.................................... | 428/493 |
| 2,528,244 | 10/1950 | Rawson................................ | 74/232 |
| 2,627,185 | 2/1953 | Bramhall et al. ..................... | 74/232 |
| 2,701,221 | 2/1955 | Clayton et al. ...................... | 428/493 |
| 3,561,493 | 2/1971 | Maillard et al. .................... | 264/173 |

*Primary Examiner*—Caleb Weston
*Attorney, Agent, or Firm*—Reuben Wolk

[57] ABSTRACT

An endless power transmission belt structure and method of making same comprised of a plurality of thermoplastic elastomeric layers with each layer having properties which are different from properties of an adjoining layer and each layer being particularly suited for the location and arrangement thereof in the belt structure.

1 Claim, 8 Drawing Figures

METHOD OF MAKING ENDLESS POWER TRANSMISSION BELT STRUCTURE

This is a division of application Ser. No. 492,948, filed July 30, 1974, now U.S. Pat. No. 3,930,417.

BACKGROUND OF THE INVENTION

The endless power transmission belt industry is a highly competitive one and there is a continuing effort to provide endless belts suitable for their associated applications yet at minimum cost. Many of such belts are expensive because numerous comparatively expensive materials are employed to arrive at the desired belt performance. Others of such belts are expensive because the materials employed are not compatible with each other and there is considerable processing required to arrive at an acceptable belt structure.

SUMMARY

This invention provides a simple and economical endless power transmission belt structure and method of making same wherein a plurality of thermoplastic elastomeric layers are employed which are compatible with each other and built up to define a belt structure and such layers having properties which are different from properties of adjoining layers with each layer being particularly suited for the location and arrangement thereof in the belt structure.

Other details, uses, and advantages of this invention will be readily apparent from the embodiments thereof presented in the accompanying specification, calims, and drawing.

BRIEF DESCRIPTION OF THE DRAWING

The accompanying drawing shows present preferred embodiments of this invention, in which.

DETAILED DESCRIPTION

Figure 1:
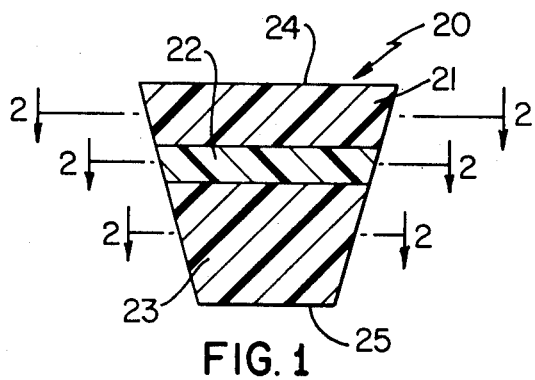
FIG. 1 is a cross-sectional view of one exemplary embodiment of the belt structure of this invention.

Reference is now made to FIG. 1 of the drawing which illustrates one exemplary embodiment of the endless power transmission belt structure of this invention which is designated generally by the reference numeral 20 and made of a plurality of thermoplastic elastomeric layers with each layer having properties which are different from properties of an adjoining layer and each layer being particularly suited to the location and arrangement thereof in the belt structure 20. In particular, the exemplary belt structure or belt 20 is made of a thermoplastic elastomer preferably in the form of three layers of a thermoplastic polyester elastomer, with the layers comprising a tension section layer 21, a load-carrying section layer 22 and a compression section layer 23. The datailed character of the thermoplastic polyester elastomer layers 21, 22 and 23 will be described in detail subsequently.

Figure 2:
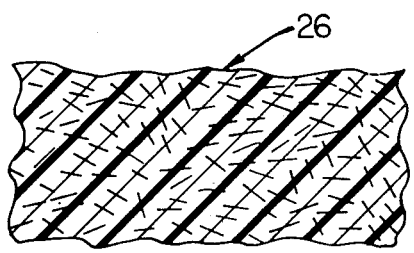
FIG. 2 is a typical fragmentary cross-sectional view taken on any one of the three lines 2—2 of FIG. 1.

The belt structure 20 has a substantially trapezoidal outline comprised of a pair of parallel sides defined as an outside surface 24 which also defines the outside surface of the tension section 21 and an inside surface 25 which also defines an exposed surface of the compression section 23. Each of the layers or sections 21, 22, and 23 extends the full width of the belt structure and has what is considered an unoriented crystalline structure. In particular, and as illustrated schematically at 26 in FIG. 2, with FIG. 2 being a typical fragmentary cross section taken on each of the lines 2—2 of FIG. 1, the unoriented crystalline structure indicates that there is no particular pattern to such crystalline structure whereby structural integrity and strength of each particular layer, either 21, 22, or 23 is less than would be the case if a highly oriented structure were employed. Nevertheless, the unoriented crystalline structure is completely satisfactory for many endless belt applications and with such structure resulting from most comparatively inexpensive manufacturing techniques the belt 20 is also comparatively inexpensive.

Figure 3:
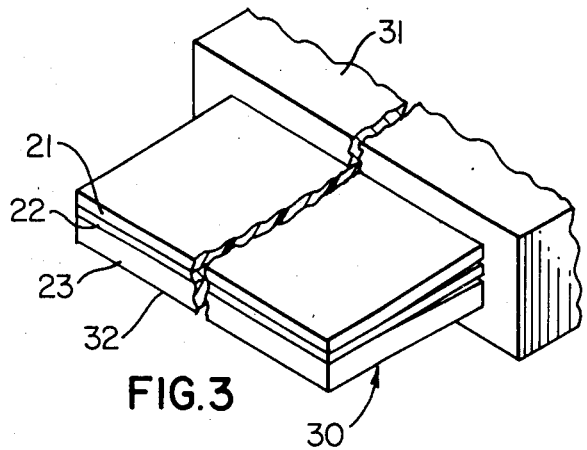
FIG. 3 is a fragmentary perspective view illustrating a method step which may be employed in making the belt of FIG. 1 wherein a plurality of three strips of a thermoplastic elastomer are extruded through an extrusion die and placed in face-to-face contact causing heat fusion thereof and the forming of a multiple layer strip assembly.

Having described the endless belt structure 20 of this invention, the detailed description will now proceed with one example of the method of this invention which may be employed to make such belt structure 20 and for this description particular reference is made to FIG. 3 of the drawing. In particular, it will be seen in FIG. 3 that a plurality of three layers of a thermoplastic elastomer are bonded together in parallel relation as indicated at 30, with each of the layers having properties which are different from properties of an adjoining layer.

The bonding is achieved by extruding a plurality of strips, corresponding in number to the plurality of layers or sections in the belt 20, through an extrusion die 31 and for simplicity and easy correlation with the belt 20 the plurality of strips being extruded through the extrusion die 31 having the same reference numerals 21, 22, and 23 as corresponding layers in the belt structure 20. The bonding as illustrated at 30, is achieved by placing the strips 21, 22, and 23 in face-to-face contact or allowing such strips to come into face-to-face contact as they emerge from the extrusion die 31, causing heat fusion thereof and the forming of a strip assembly which is designated by the reference numeral 32.

Figure 4:
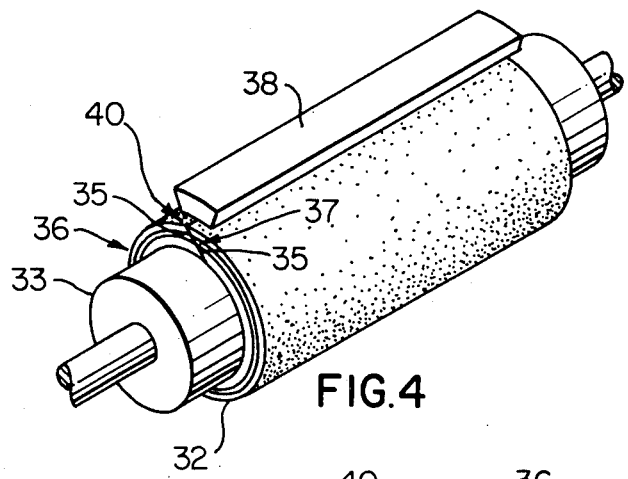
FIG. 4 is a perspective view illustrating a length of the strip assembly wrapped around a building cylinder and the heat fusion of opposite ends of such length to define a sleeve.

The strip assembly 32 may be suitably cut and a cut length of such strip assembly, also designated 32, is wrapped around a building cylinder 33 as illustrated in FIG. 4 and the ends 35 of such length of strip assembly 32 are heat fused together to define a sleeve which is designated by the general reference numeral 36. The ends 35 of the strip assembly are beveled, as indicated at 37 to facilitate the heat fusion thereof and the heat fusion is accomplished utilizing any suitable heating device or heater, such as the device 38, which may be of any known construction. It will be appreciated that while a beveled joint is illustrated at 37 as defining the sleeve 36, any suitable type of joint may be provided and the heat fusion provided by heat fusing the thermoplastic polyester elastomer results in the provision of a heat fused area indicated at 40.

The sleeve 36 is allowed to cool or forcefully cooled using any technique known in the art whereupon the sleeve 36 is ready to be cut to define a plurality of endless power transmission belt structures 20.

The sleeve 36 supported on the rotating drum or mandrel 33 is cut utilizing cutting means or knives 41 and the cutting action is achieved by relatively rotating the drum 33, with the sleeve 36 fixed thereon, and the knives 41 in a manner which is well known in the art to define a plurality of endless belts from the sleeve 36.

Figure 6:
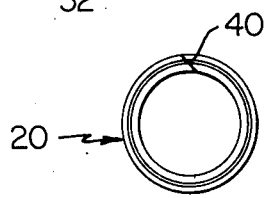
FIG. 6 is a view looking at a side of a belt made by cutting action as disclosed in FIG. 5 and schematically illustrating the heat fused area thereof.

Each endless power transmission belt structure 20 made in the manner described above has a heat fused area which in the completed belt 20 shown in FIG. 6 is also designated by the reference numeral at 40; and, due to the character of the thermoplastic polyester elastomer such heat fused area has physical properties which are substantially equal to the physical properties of the remainder of the belt structure.

Another exemplary embodiment of the method of this invention is illustrated in part in FIG. 7 of the drawing and wherein the bonding step comprises the bonding of a plurality of three tubular members which for simplicity will be given the same reference numerals 21, 22, and 23 to correspond to the layers of the endless power transmission belt 20. The tubular members are extruded in a concentric manner through an extrusion die 44 and such tubular members are placed face-to-face as they exit the outlet at 45 of the die 44 causing heat fusion thereof and the forming of a multiple layer sleeve similar to the sleeve 36 formed around the mandrel 33 of FIG. 4.

Figure 7:
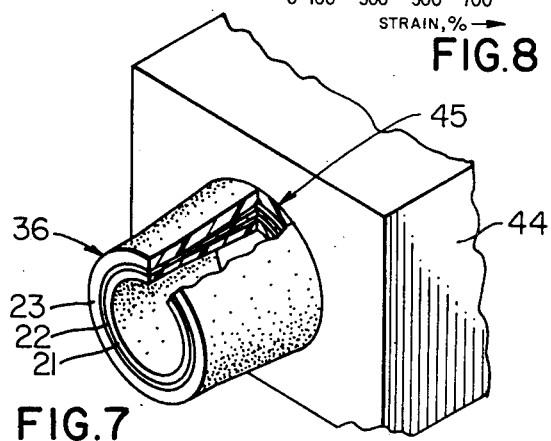
FIG. 7 is a fragmentary perspective view illustrating the extrusion of a plurality of three tubular members made of a thermoplastic elastomer through an extrusion die and concentrically against each other to define a multiple layer sleeve wherein each layer of the sleeve has a substantially uniform character throughout.

Actually, the multiple layer sleeve defined as shown in FIG. 7, and also designated by the reference numeral 36, may then be placed on a mandrel 33 by axially sliding such sleeve thereover. The mandrel may have suitable means of known construction enabling expansion of the outside surface of the mandrel against the inside surface of the sleeve to assure holding the sleeve firmly in position to enable easy cutting of such sleeve. The cutting may be achieved in a similar manner as described in FIG. 5 to define a plurality of endless power transmission belt structures 20. The belt structures formed with the technique of FIG. 7 differ from the belt structure formed utilizing the method step described in connection with FIGS. 4 and 5 primarily in that they do not have a heat fused area as shown at 40 in FIG. 6 but have a substantially uniform character throughout free of a heat fused area.

Figure 8:
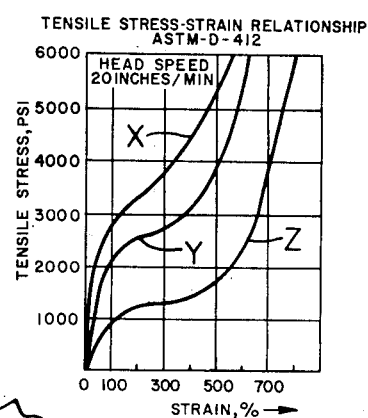
FIG. 8 is a graph particularly illustrating the tensile stress-strain relationship of three exemplary types of a thermoplastic elastomer which may be used to define the belt structure of this invention and carry out the method of this invention.

It will be seen from FIG. 8 of the drawing that various grades of thermoplastic polyester elastomer may be employed to define the various belt sections. For example, material grade having properties or a stress-strain curve as indicated by the curve X in FIG. 8 when tested in accordance with ASTM-D-412 may be used to define the compression section 23, material having a stress-strain curve as indicated by the curve Y may be used to define the load-carrying section 22; and material having stress-strain curve as indicated by the curve Z may be used to define the tension section.

In this disclosure of the invention a plurality of three layers of a thermoplastic polyester elastomer have been illustrated and described in defining the belt structure 20 having a trapezoidal cross-sectional outline; however, it must be appreciated that the concept of this invention of employing various grades or types of thermoplastic polyester elastomer in layer form may be employed in belts having two layers which comprise the entire belt cross-section or more than three layers. Also, the belt cross-section may be any suitable cross-section other than trapezoidal.

It will also be appreciated that the concept of this invention may be employed to define so-called banded belts, toothed belts having teeth provided as an integral part of the compression section, and toothed belts having teeth provided on outside and inside surfaces thereof. For example, for a timing belt structure the belt teeth may be of a comparatively harder thermoplastic elastomer compound than would be employed for a regular V-belt of trapezoidal cross section. Similarly, a belt employed with teeth and for clutching operation would have its teeth comparatively softer than in a timing belt.

Figure 5:
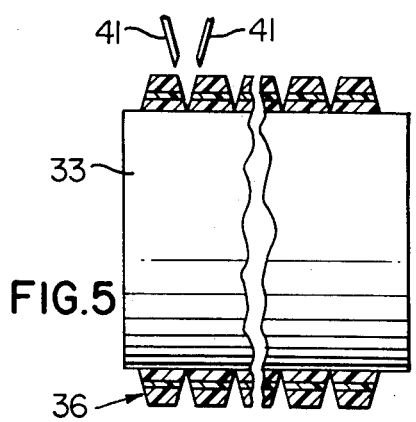
FIG. 5 is a view with parts in elevation, parts in cross section, and parts broken away particularly illustrating the manner in which the sleeve is cut by suitable knife means to define a plurality of endless power transmission belts similar to the belt of FIG. 1.

In this disclosure of the invention it will be noted that the mandrel 33 illustrated in FIG. 5 is shown with the opposed end portions thereof removed and this has been done for simiplicity.

It should be emphasized that the utilization of a thermoplastic elastomer to define various component portions of a belt such as the tension section 21, load-carrying section 22 and compression section 23 of belt 20 enables such component portions to be integrally adhered or bonded together simply due to the thermoplastic character of the material and without requiring additional adhesive means, or the like, at the interfaces of such component portions.

Any suitable thermoplastic elastomer may be employed to make the belt structure 20; however, the belt structure 20 is preferably made using a high performance thermoplastic polyester elastomer sold under the trademark of "HYTREL" by the E. I. DuPont de Numours Co. of Wilmington, Delaware.

While present exemplary embodiments of this invention, and methods of practicing the same, have been illustrated and described, it will be recognized that this invention may be otherwise variously embodied and practiced within the scope of the following claims.

What is claimed is:

1. A method of making an endless power transmission belt structure comprising the steps of, bonding a plurality of layers of a thermoplastic elastomer together in parallel relation, each of said layers having properties which are different from properties of an adjoining layer, said bonding step comprising extruding a plurality of strips of said thermoplastic elastomer corresponding in number to said plurality of layers, placing said strips face-to-face causing heat fusion thereof and the forming of a strip assembly, wrapping said strip assembly about a building cylinder, heat fusing the ends of said strip assembly together to define a sleeve having a heat fused area, and cooling said sleeve; and completing said endless belt structure using said bonded layers, said completing step comprising cutting said sleeve to define a plurality of endless belt structures wherein each of said belt structures has a heat fused area corresponding to the area of fusion when it comprised said sleeve, said heat fused area of each belt having physical properties which are substantially equal to the physical properties of the remainder of said belt structure.

* * * * *